US008121753B2

(12) United States Patent
Bauchot et al.

(10) Patent No.: US 8,121,753 B2
(45) Date of Patent: Feb. 21, 2012

(54) SYSTEM AND METHOD FOR GATHERING AND SUBMITTING DATA TO A THIRD PARTY IN RESPONSE TO A VEHICLE BEING INVOLVED IN AN ACCIDENT

(75) Inventors: Frederic Bauchot, Saint-Jeannet (FR); Jean-Yves Clement, Saint-Jeannet (FR); Gerard Marmigére, Drap (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/176,767

(22) Filed: Jul. 21, 2008

(65) Prior Publication Data

US 2010/0004816 A1 Jan. 7, 2010

(30) Foreign Application Priority Data

Jul. 7, 2008 (EP) .................................... 08305382

(51) Int. Cl.
*G01M 17/00* (2006.01)
(52) U.S. Cl. ......................................................... 701/35
(58) Field of Classification Search .................... 701/35, 701/117, 300; 340/5.8, 435, 436
See application file for complete search history.

(56) References Cited

U.S. PATENT DOCUMENTS

| 6,141,611 | A | 10/2000 | Mackey et al. | |
|---|---|---|---|---|
| 6,246,933 | B1 | 6/2001 | Bague | |
| 6,756,884 | B1 * | 6/2004 | Dijkstra | 340/425.5 |
| 7,254,482 | B2 | 8/2007 | Kawasaki et al. | |
| 7,317,397 | B2 | 1/2008 | Gunsauley | |
| 7,327,238 | B2 | 2/2008 | Bhogal et al. | |
| 7,680,680 | B2 * | 3/2010 | Wahlbin et al. | 705/4 |
| 2003/0028298 | A1 | 2/2003 | Macky et al. | |
| 2007/0200691 | A1 * | 8/2007 | Lam et al. | 340/436 |
| 2007/0288135 | A1 * | 12/2007 | Kidd et al. | 701/29 |
| 2009/0045910 | A1 * | 2/2009 | Zoller et al. | 340/5.8 |

FOREIGN PATENT DOCUMENTS

| CN | 11061060 A | 10/2007 |
|---|---|---|
| EP | 1320004 B1 | 5/2004 |
| JP | 2004090879 | 3/2004 |
| JP | 2005100107 | 4/2005 |
| JP | 2006168717 | 6/2006 |
| WO | 2006053676 A1 | 5/2006 |
| WO | 2007078942 A2 | 7/2007 |
| WO | 2008007878 A1 | 1/2008 |

* cited by examiner

*Primary Examiner* — Faye M. Fleming
(74) *Attorney, Agent, or Firm* — Schmeiser, Olsen & Watts; John Pivnichny (57) ABSTRACT

A system and associated method for gathering and submitting data to a third party in response to a vehicle being involved in an accident. First an information manager stores data regardless of the vehicle being involved in an accident. Next the event detection manager stores data in response to detecting the vehicle being involved in an accident. Next the information manager stores state data pertaining to the vehicle's current state. Then an adjacent identifier manager requests, receives, and stores data from surrounding vehicles in memory. Next a report is generated and encrypted. Finally, the encryption and transmission manager stores the report in memory.

25 Claims, 4 Drawing Sheets

FIG. 3

SYSTEM AND METHOD FOR GATHERING AND SUBMITTING DATA TO A THIRD PARTY IN RESPONSE TO A VEHICLE BEING INVOLVED IN AN ACCIDENT

BACKGROUND OF THE INVENTION

The present invention relates generally to notification systems, and more particularly to an automated monitoring system for providing information about automobile collisions.

It is common for an automobile accident to occur in which the only witness is the offending party. When the offending party fails to provide contact information, the innocent victim is left without a means of identifying the responsible party or determining who was at fault.

Similarly, when two parties are involved in an automobile accident, the shock of the situation may impair one party's ability to obtain contact information about the other. Additionally, a party may not be able to remember or articulate the events immediately preceding the accident or subsequent thereto.

SUMMARY OF THE INVENTION

In view of the foregoing and other exemplary problems, drawbacks, and disadvantages of the conventional systems and methods, the present invention provides a method for gathering and submitting data to a third party in response to a vehicle being involved in an accident, the method comprising:

storing sensor data in memory, said storing said sensor data being performed by an information manager that receives said sensor data from at least one sensor in response to a request from said information manager, said memory and said at least one sensor and said information manager all being attached to said vehicle;

storing detector data in said memory in response to said vehicle being involved in an accident, said storing said detector data being performed by an event detection manager that receives said detector data from at least one detector in response to said at least one detector detecting said accident, said at least one detector and said event detection manager both being attached to said vehicle;

after said storing said detector data, storing state data in said memory in response to said vehicle being involved in said accident, said storing said state data being performed by said information manager that receives said state data from said at least one sensor;

after said storing said detector data, storing surrounding vehicle data in said memory in response to said vehicle being involved in said accident, said storing said surrounding vehicle data being performed by an adjacent identifier manager that receives said surrounding vehicle data from at least one surrounding vehicle in response to a request from said adjacent identifier manager, said adjacent identifier manager being attached to said vehicle;

generating and encrypting a report, said report comprising said sensor data and said detector data and said state data and said surrounding vehicle data residing in said memory, said generating and said encrypting being performed by an encryption and transmission manager that receives a request from a report manager, said encryption and transmission manager and said report manager both being attached to said vehicle; and after said generating and said encrypting said report, storing said report in said memory, said storing said report being performed by said encryption and transmission manager that receives a request from said report manager.

DETAILED DESCRIPTION OF THE DRAWINGS

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

The term accident as used in the detailed specification and claims hereinafter means a collision between two or more vehicles wherein each vehicle is separately operated by an individual. The term incident as used in the detailed specification and claims hereinafter means a collision between two or more vehicles where at least one vehicle is not operated by an individual.

Figure 1:
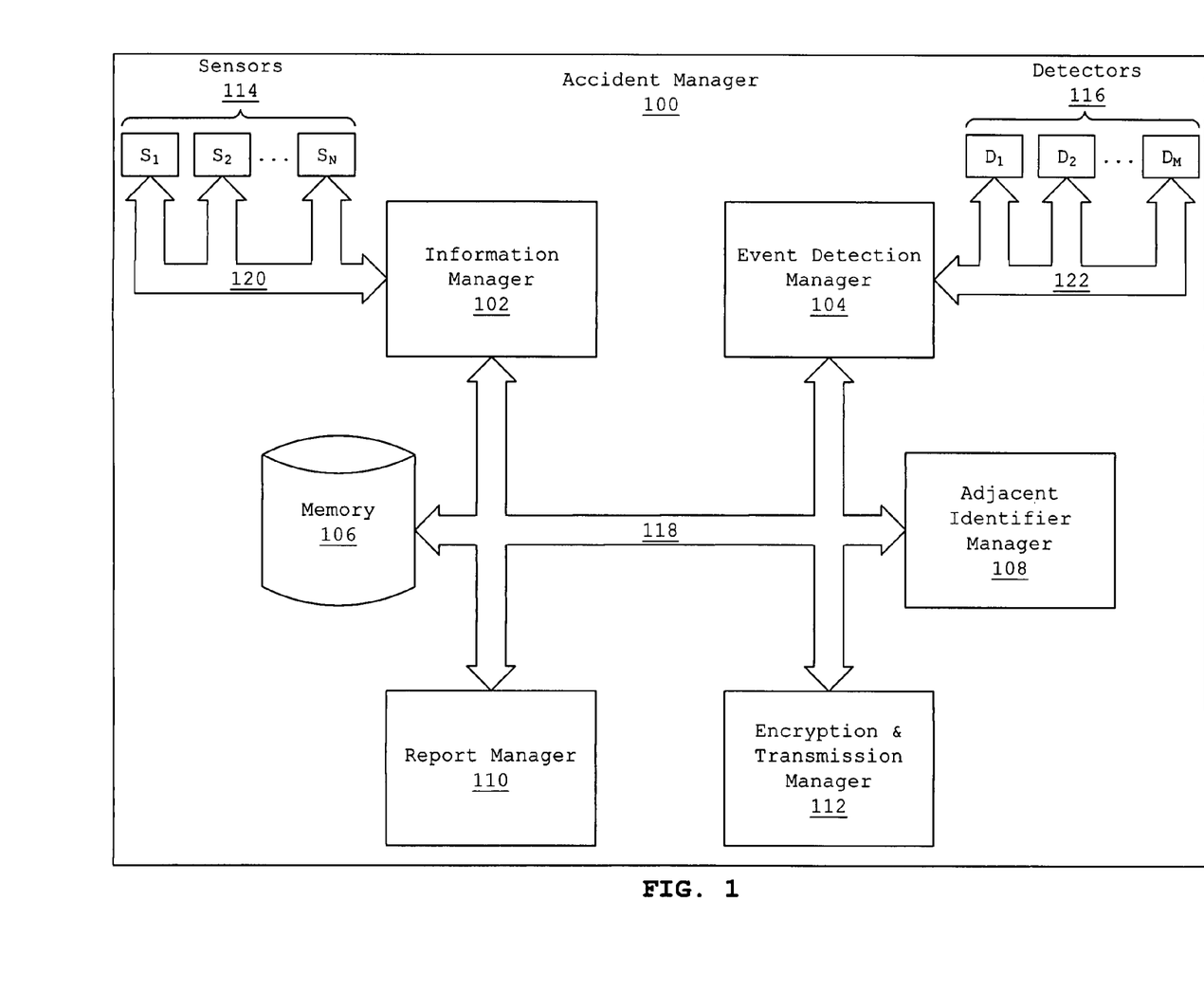
FIG. 1 illustrates the components comprising an accident manager which utilizing said components gathers and submits data to a third party in response to being involved in an accident, in accordance with embodiments of the present invention.

FIG. 1 illustrates the components comprising an accident manager 100 which utilizing said components gathers and submits data to a third party in response to being involved in an accident, in accordance with embodiments of the present invention.

The accident manager 100 comprises an information manager 102, an event detection manager 104, memory 106, an adjacent identifier manager 108, a report manager 110, an encryption and transmission manager 112, and a bus 118.

The bus 118 allows for the exchange of information and command/responses between the different components of the accident manager 100. Specifically, the bus 118 interconnects the memory 106 with the report manager 110, the encryption and transmission manager 112, the event detection manager 104, and the information manager 102. The bus 118 indifferently carries either data for memory 106 read/write operations or command/response messages exchanged between the different components of the accident manager 100.

The information manager 102 is the component managing the retrieval of vehicle operating conditions that are recorded to memory 106 both on a regular basis (background task) and upon detection of an event revealing either an accident or an incident. The information manager 102 is interconnected to a collection of sensors $S_1$, $S_2$, through $S_N$ via a bus 120. Examples of such sensors (hereinafter collectively referred to as "sensors $S_x$") may be, inter alia, a global positioning system (GPS) device, a speedometer, a brake meter, a slope meter, a sensor determining the position of the car windows, a sensor determining the volume of the radio, a sensor determining the weight of the driver, a sensor determining the presence and weight of passengers, etc.

The event detection manager 104 is the component managing the detection of an event revealing either an accident or an incident. The event detection manager 104 is interconnected to a collection of detectors $D_1$, $D_2$, through $D_M$ via a bus 122. Examples of detectors are, inter alia, a choke detector, an accelerometer, neighborhood radar, etc. Once one of these detectors (hereinafter collectively referred to as "detectors $D_x$") identifies a condition corresponding to an accident or incident, the detectors $D_x$ notifies the event detection manager 104 which in turn notifies the report manager 110 about the detected accident or incident.

The adjacent identifier manager 108 is the component responsible for searching and discovering the identity of adjacent vehicles found in the vicinity of the accident manager 100. In one embodiment of the present invention, the adjacent identifier manager 108 is radio frequency identification (RFID) reader utilized to interrogate RFID tags located on the adjacent vehicles. Such RFID tags when interrogated answer with the adjacent vehicle identifier and optionally with an information specifying where the answering RFID tag is hooked on the vehicle (front bumper, left front aisle, back bumper, etc.).

The report manager 110 is the core element of the solution as it drives the method involving the other elements of the accident manager 100. The memory 106 is conventional memory aimed to store various data acquired by the different components as well as a comprehensive report built in response to an accident.

The encryption and transmission manager 112 is responsible for both ciphering and transmitting the report to a third party. Examples of a third party may be, inter alia, an insurance company, police department, hospital, fire department, emergency medical services (EMS), etc. The underlying encryption and communications means within the encryption and transmission manager 112 are conventional and do not constitute, per se, the core of the present invention.

In one embodiment of the present invention the ciphering means are based on public key encryption while the transmission means are based on wireless communication technology; however the proposed invention can deliver the desired functionality without imposing a specific ciphering or transmission scheme. The only assumption made for the encryption and transmission manager 112 is the fact that the transmission means operate in a disconnected way. This means the encryption and transmission manager 112 is able to retain in memory 106 the report to be transmitted as long as the required network infrastructure is found unavailable, and transmit the report to a third party once the network infrastructure becomes available.

Figure 2:
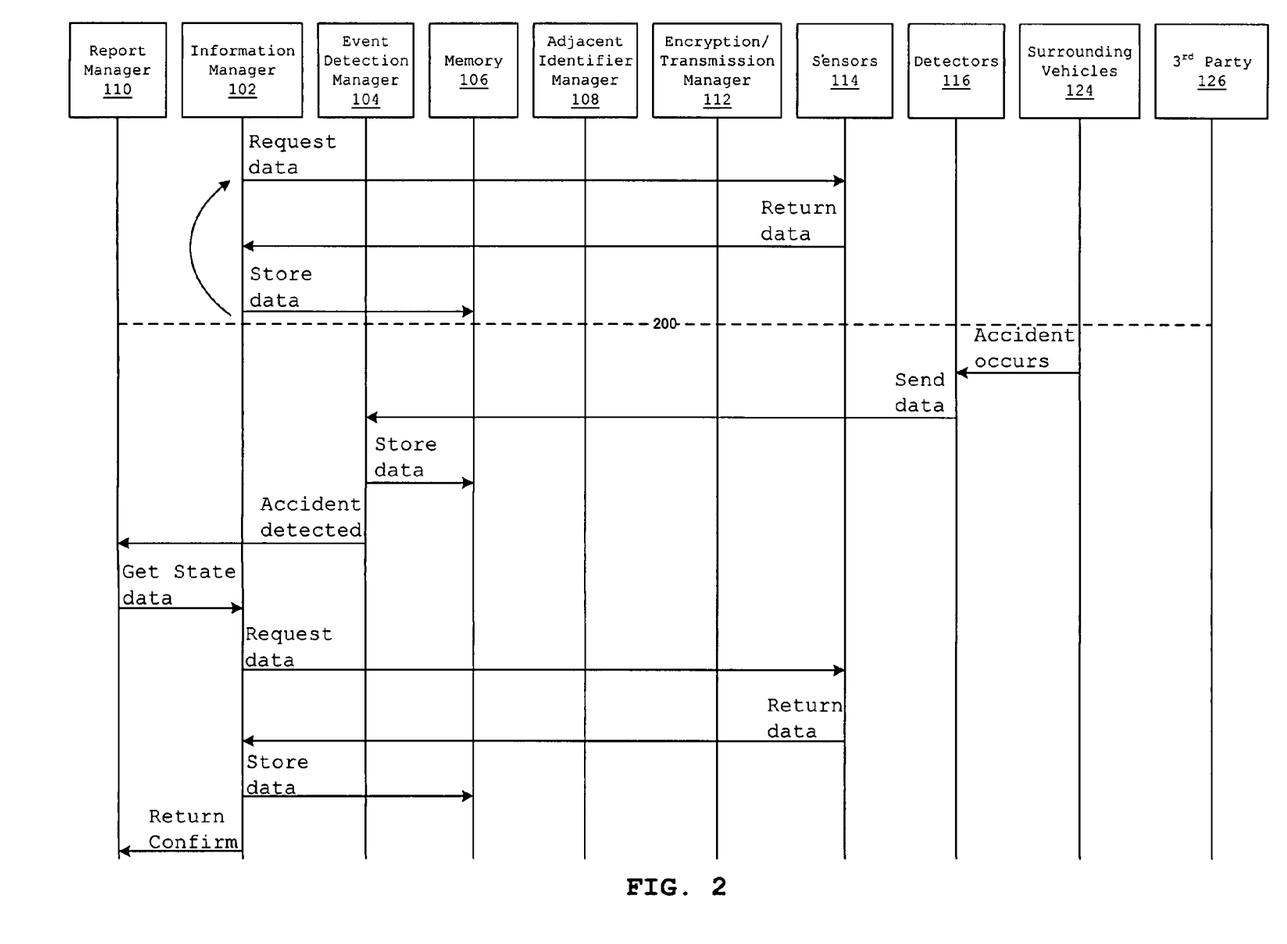
FIG. 2 illustrates a data flow diagram depicting a method to gather and submit data to a third party in response to being involved in an accident, in accordance with embodiments of the present invention.

FIG. 2 illustrates a data flow diagram depicting a method to gather and submit data to a third party in response to being involved in an accident, in accordance with embodiments of the present invention.

The flow diagram followed by the different components comprised in the accident manager 100 (see FIG. 1, supra) is made of two distinct phases. The first phase corresponds to the background tasks undertaken as a continuous operation. The second phase corresponds to the method followed in response to the occurrence of an accident or an incident. The separation between the first phase and the second phase is the dashed line 200.

In response to a cyclic event, the information manager 102 requests data from the sensors 114 via the bus 120. The sensors 114 return their individual state data (e.g. speed, direction, GPS location, weight of driver, weight of passengers, etc.) to the information manager 102 via the bus 120. The information manager 102 in response to receiving data from the sensors 114, stores said data in memory 106. The information manager 102 then awaits the next cyclical event to repeat the steps comprising the first phase. In one embodiment of the present invention, the data collected and stored in the first phase is utilized to demonstrate to a third party the state of the innocent victim's vehicle shortly before the accident or incident.

The transition from the first phase to the second phase (denoted by line 200) occurs in response to an accident/incident. An accident/incident occurs when a surrounding vehicle 124 comes into contact with one of the detectors 116. In response to detecting an accident/incident involving the surrounding vehicle 124, the detectors 116 send data to the event detection manager 104 via the bus 122. In one embodiment of the present invention, the data sent by the detectors 116 to the event detection manager 102 may include, inter alia, a spike in the accelerometer reading, a sudden change in trajectory, an abrupt change in vector, etc.

In response to receiving data from the detectors 116, the event detection manager 102 stores said data in memory 106 via the bus 118. Additionally, the event detection manager 102 notifies the report manager 110 that an accident/incident has occurred. In response to receiving notification of the accident/incident, the report manager 110 requests state data from the information manager 102 via the bus 118.

The information manager 102 requests data from the sensors 114 via the bus 120. In response to receiving the data request, the sensors 114 return data to the information manager 102 via the bus 120. In one embodiment of the present invention, the data returned to the information manager 102 includes, inter alia, the GPS location of the accident manager 100, the current speed of the vehicle containing the accident manager 100, the current pressure applied brake system, the current slope of the vehicle containing the accident manager 100, the position of the car windows, the volume of the radio, weight of the person in the driver's seat, the presence and weight of passengers, etc.

Upon receipt of the data sent by the sensors 114, the information manager 102 stores the data in memory 106 via the bus 118. Furthermore, the information manager 102 confirms to the report manager 110 the receipt of data pertaining to the vehicle containing the accident manager 100.

In response to receiving the confirmation from the information manager 102, the report manager 110 requests the state data of the surrounding vehicles 124. The request is sent to the adjacent identifier manager 108 via the bus 118.

The adjacent identifier manager 108 requests the state from all surrounding vehicles 124, whether participant in the accident/incident or witnesses to said accident/incident. In one embodiment of the present invention, the request is submitted to all RFID tags which the adjacent identifier manager 108 detects at the moment the data request is received from the report manager 100 via the bus 118. After receipt of the state information pertaining to all the surrounding vehicles 124, the adjacent identifier manager 108 stores the data in memory 106 via the bus 118. Additionally, the adjacent identifier manager 108 confirms to the report manager 110 the receipt of data pertaining to the surrounding vehicles 124.

In response to receiving the confirmation from the adjacent identifier manager 108, the report manager 110 submits the collected data to the $3^{rd}$ party 126. To facilitate the submission of the data to the $3^{rd}$ party 126, the report manager 110 sends the request to the encryption & transmission manager 112 via the bus 118.

The encryption & transmission manager 112 receives the submission request from the report manager 110 and in turn requests data from memory 106 via the bus 118. In one embodiment of the present invention, the encryption & transmission manager 112 requests the current state data for the vehicle containing the accident manager 100, the state data of the vehicle containing the accident manager 100 immediately preceding the accident/incident, as well as the state data of the surrounding vehicles 124 immediately preceding and after the accident/incident. In one embodiment of the present invention, the encryption & transmission manager 112 encrypts the report comprising the requested data in such a way that only the $3^{rd}$ party 126 may decrypt it. Furthermore, the encryption & transmission manager 112 may also digitally sign the data report in such a way that the $3^{rd}$ party can determine that only the accident manger 110 could have submitted said report.

After encrypting the report, the encryption & transmission manager 112 stores the report in memory 106. After storing the report in memory 106, the encryption & transmission manager 112 submits the report to the $3^{rd}$ party 126 if a network connection is present. In one embodiment of the present invention, if a wireless connection is not available to facilitate submission of the report to the $3^{rd}$ party 126, the encryption & transmission manager 112 waits until a wireless connection becomes available and submits the report therein.

In response to receiving from the $3^{rd}$ party 126 a receipt confirming transmission of the report, the encryption & transmission manager 112 stores said receipt in memory 106 via the bus 118. Furthermore, the encryption & transmission manager 112 returns a confirmation to the report manager 110 that submission was successful.

Figure 3:
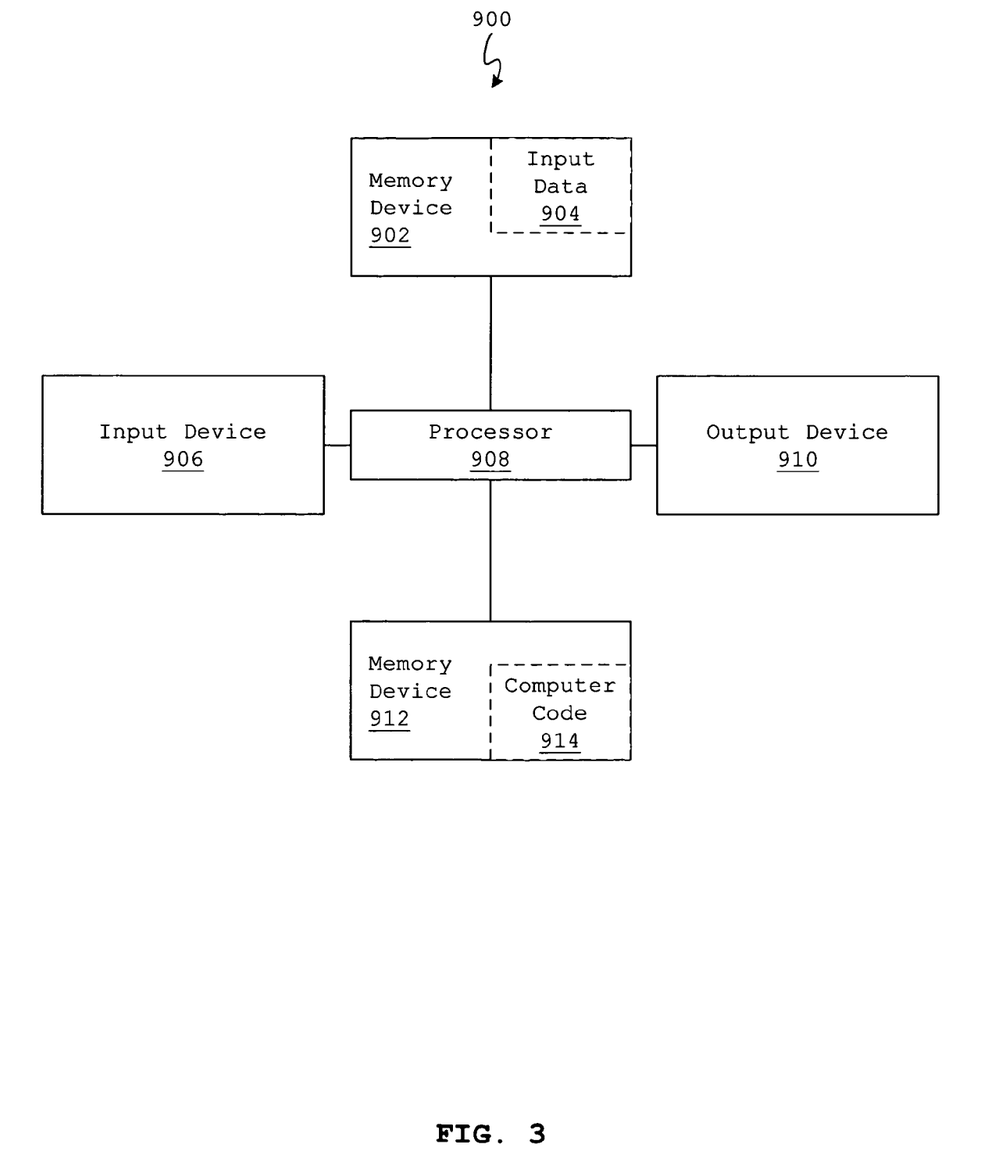
FIG. 3 illustrates a computer system which may facilitate a method for gathering and submitting data to a third party in response to being involved in an accident, in accordance with embodiments of the present invention.

FIG. 3 illustrates a computer system which may facilitate a method for gathering and submitting data to a third party in response to being involved in an accident, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for gathering and submitting data to a third party in response to being involved in an accident according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 3) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for gathering and submitting data to a third party in response to being involved in an accident. Thus, the present invention discloses a process for supporting computer infrastructure, comprising integrating, hosting, maintaining and deploying computer-readable code into a computing system (e.g., computing system 900), wherein the code in combination with the computing system is capable of performing a method for gathering and submitting data to a third party in response to being involved in an accident.

In another embodiment, the invention provides a business method that performs the process steps of the invention on a subscription, advertising and/or fee basis. That is, a service provider, such as a Solution Integrator, can offer to create, maintain, support, etc. a process for gathering and submitting data to a third party in response to being involved in an accident. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 3 shows the computer system 900 as a particular configuration of hardware and software, any configuration of hardware and software, as would be known to a person of ordinary skill in the art, may be utilized for the purposes stated supra in conjunction with the particular computer system 900 of FIG. 3. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for gathering and submitting data to a third party in response to a vehicle being involved in an accident, the method comprising:

storing sensor data in memory, said storing said sensor data being performed by an information manager that receives said sensor data from at least one sensor in response to a request from said information manager, said memory and said at least one sensor and said information manager all being attached to said vehicle;

storing detector data in said memory in response to said vehicle being involved in an accident, said storing said detector data being performed by an event detection manager that receives said detector data from at least one detector in response to said at least one detector detecting said accident, said at least one detector and said event detection manager both being attached to said vehicle;

after said storing said detector data, storing state data in said memory in response to said vehicle being involved in said accident, said storing said state data being performed by said information manager that receives said state data from said at least one sensor;

after said storing said detector data, storing surrounding vehicle data in said memory in response to said vehicle being involved in said accident, said storing said surrounding vehicle data being performed by an adjacent identifier manager that receives said surrounding vehicle data from at least one surrounding vehicle in response to a request from said adjacent identifier manager, said adjacent identifier manager being attached to said vehicle;

generating and encrypting a report, said report comprising said sensor data and said detector data and said state data and said surrounding vehicle data residing in said memory, said generating and said encrypting being performed by an encryption and transmission manager that receives a request from a report manager, said encryption and transmission manager and said report manager both being attached to said vehicle; and after said generating and said encrypting said report, storing said report in said memory, said storing said report being performed by said encryption and transmission manager that receives a request from said report manager.

2. The method of claim 1, said method further comprising:

after said storing said report in said memory, storing a receipt in said memory, said storing said receipt being performed by said encryption and transmission manager that receives said receipt from said third party, said receipt comprising an acknowledgement that said third party received said report from said encryption and transmission manager in response to said vehicle being involved in said accident.

3. The method of claim 1, wherein said sensor data is being requested by said information manager both cyclically and independently of said vehicle being involved in said accident.

4. The method of claim 1, wherein each surrounding vehicle in said at least one surrounding vehicle is selected from the group consisting of a participant vehicle and a witness vehicle, said participant vehicle being involved in said accident with said vehicle, said witness vehicles not being involved in said accident but within such a proximity to said accident so as to being able to provide eyewitness information corresponding to a cause of said accident.

5. The method of claim 1, wherein said surrounding vehicle data received from each surrounding vehicle in said at least one surrounding vehicle comprises sensor data, detector data, and state data, respectively.

6. The method of claim 1, wherein each sensor in said at least one sensor is selected from the group comprising a global positioning system device, a speedometer, a brake meter, a slope meter, a sensor determining a position of each vehicle window, a sensor determining volume of a radio attached to said vehicle, a sensor determining the weight of a driver of said vehicle, a sensor determining whether windshield wipers are operating on said vehicle, a sensor determining whether headlights are operating on said vehicle, and a sensor determining both presence and weight of a passenger of said vehicle.

7. The method of claim 1, wherein each detector in said at least one detector is selected from the group comprising a choke detector, an accelerometer, a neighborhood radar, a supplemental restraint system, an impact detector, and a gyroscope.

8. A computer program product, comprising a computer-usable storage medium having a computer-readable program code stored therein, said computer-readable program code containing instructions that when executed by a processor of a computer system implement a method for gathering and submitting data to a third party in response to a vehicle being involved in an accident, the method comprising:

storing sensor data in memory, said storing said sensor data being performed by an information manager that receives said sensor data from at least one sensor in response to a request from said information manager, said memory and said at least one sensor and said information manager all being attached to said vehicle;

storing detector data in said memory in response to said vehicle being involved in an accident, said storing said detector data being performed by an event detection manager that receives said detector data from at least one detector in response to said at least one detector detecting said accident, said at least one detector and said event detection manager both being attached to said vehicle;

after said storing said detector data, storing state data in said memory in response to said vehicle being involved in said accident, said storing said state data being performed by said information manager that receives said state data from said at least one sensor;

after said storing said detector data, storing surrounding vehicle data in said memory in response to said vehicle being involved in said accident, said storing said surrounding vehicle data being performed by an adjacent identifier manager that receives said surrounding vehicle data from at least one surrounding vehicle in response to a request from said adjacent identifier manager, said adjacent identifier manager being attached to said vehicle;

generating and encrypting a report, said report comprising said sensor data and said detector data and said state data and said surrounding vehicle data residing in said memory, said generating and said encrypting being performed by an encryption and transmission manager that receives a request from a report manager, said encryption and transmission manager and said report manager both being attached to said vehicle; and after said generating and said encrypting said report, storing said report in said memory, said storing said report being performed by said encryption and transmission manager that receives a request from said report manager.

9. The method of claim 1, said method further comprising:

after said storing said report in said memory, storing a receipt in said memory, said storing said receipt being performed by said encryption and transmission manager that receives said receipt from said third party, said receipt comprising an acknowledgement that said third party received said report from said encryption and transmission manager in response to said vehicle being involved in said accident.

10. The computer program product of claim 8, wherein said sensor data is being requested by said information manager both cyclically and independently of said vehicle being involved in said accident.

11. The computer program product of claim 8, wherein each surrounding vehicle in said at least one surrounding vehicle is selected from the group consisting of a participant vehicle and a witness vehicle, said participant vehicle being involved in said accident with said vehicle, said witness vehicles not being involved in said accident but within such a proximity to said accident so as to being able to provide eyewitness information corresponding to a cause of said accident.

12. The computer program product of claim 8, wherein said surrounding vehicle data received from each surrounding vehicle in said at least one surrounding vehicle comprises sensor data, detector data, and state data, respectively.

13. The computer program product of claim 8, wherein each sensor in said at least one sensor is selected from the group comprising a global positioning system device, a speedometer, a brake meter, a slope meter, a sensor determining a position of each vehicle window, a sensor determining volume of a radio attached to said vehicle, a sensor determining the weight of a driver of said vehicle, a sensor determining whether windshield wipers are operating on said vehicle, a sensor determining whether headlights are operating on said vehicle, and a sensor determining both presence and weight of a passenger of said vehicle.

14. The computer program product of claim 8, wherein each detector in said at least one detector is selected from the group comprising a choke detector, an accelerometer, a neighborhood radar, a supplemental restraint system, an impact detector, and a gyroscope.

15. A computing system comprising a processor coupled to a computer-readable memory unit, said memory unit comprising a software application, said software application comprising instruction that when executed by said processor, implement a method for gathering and submitting data to a third party in response to a vehicle being involved in an accident, the method comprising:

storing sensor data in memory, said storing said sensor data being performed by an information manager that receives said sensor data from at least one sensor in response to a request from said information manager, said memory and said at least one sensor and said information manager all being attached to said vehicle;

storing detector data in said memory in response to said vehicle being involved in an accident, said storing said detector data being performed by an event detection manager that receives said detector data from at least one detector in response to said at least one detector detecting said accident, said at least one detector and said event detection manager both being attached to said vehicle;

after said storing said detector data, storing state data in said memory in response to said vehicle being involved in said accident, said storing said state data being performed by said information manager that receives said state data from said at least one sensor;

after said storing said detector data, storing surrounding vehicle data in said memory in response to said vehicle being involved in said accident, said storing said surrounding vehicle data being performed by an adjacent identifier manager that receives said surrounding vehicle data from at least one surrounding vehicle in response to a request from said adjacent identifier manager, said adjacent identifier manager being attached to said vehicle;

generating and encrypting a report, said report comprising said sensor data and said detector data and said state data and said surrounding vehicle data residing in said memory, said generating and said encrypting being performed by an encryption and transmission manager that receives a request from a report manager, said encryption and transmission manager and said report manager both being attached to said vehicle; and after said generating and said encrypting said report, storing said report in said memory, said storing said report being performed by said encryption and transmission manager that receives a request from said report manager.

16. The method of claim 1, said method further comprising:

after said storing said report in said memory, storing a receipt in said memory, said storing said receipt being performed by said encryption and transmission manager that receives said receipt from said third party, said receipt comprising an acknowledgement that said third party received said report from said encryption and transmission manager in response to said vehicle being involved in said accident.

17. The computing system of claim 15, wherein said sensor data is being requested by said information manager both cyclically and independently of said vehicle being involved in said accident.

18. The computing system of claim 15, wherein each surrounding vehicle in said at least one surrounding vehicle is selected from the group consisting of a participant vehicle and a witness vehicle, said participant vehicle being involved in said accident with said vehicle, said witness vehicles not being involved in said accident but within such a proximity to said accident so as to being able to provide eyewitness information corresponding to a cause of said accident.

19. The computing system of claim 15, wherein said surrounding vehicle data received from each surrounding vehicle in said at least one surrounding vehicle comprises sensor data, detector data, and state data, respectively.

20. The computing system of claim 15, wherein each sensor in said at least one sensor is selected from the group comprising a global positioning system device, a speedometer, a brake meter, a slope meter, a sensor determining a position of each vehicle window, a sensor determining volume of a radio attached to said vehicle, a sensor determining the weight of a driver of said vehicle, a sensor determining whether windshield wipers are operating on said vehicle, a sensor determining whether headlights are operating on said vehicle, and a sensor determining both presence and weight of a passenger of said vehicle.

21. The computing system of claim 15, wherein each detector in said at least one detector is selected from the group comprising a choke detector, an accelerometer, a neighborhood radar, a supplemental restraint system, an impact detector, and a gyroscope.

22. A process for supporting computer infrastructure, said process comprising providing at least one support service for at least one of creating, integrating, hosting, maintaining, and deploying computer-readable code in a computing system, wherein said code in combination with the computing system is capable of implementing a method for gathering and submitting data to a third party in response to a vehicle being involved in an accident, the method comprising:

storing sensor data in memory, said storing said sensor data being performed by an information manager that receives said sensor data from at least one sensor in response to a request from said information manager, said memory and said at least one sensor and said information manager all being attached to said vehicle;

storing detector data in said memory in response to said vehicle being involved in an accident, said storing said detector data being performed by an event detection manager that receives said detector data from at least one detector in response to said at least one detector detecting said accident, said at least one detector and said event detection manager both being attached to said vehicle;

after said storing said detector data, storing state data in said memory in response to said vehicle being involved in said accident, said storing said state data being performed by said information manager that receives said state data from said at least one sensor;

after said storing said detector data, storing surrounding vehicle data in said memory in response to said vehicle being involved in said accident, said storing said surrounding vehicle data being performed by an adjacent identifier manager that receives said surrounding vehicle data from at least one surrounding vehicle in response to a request from said adjacent identifier manager, said adjacent identifier manager being attached to said vehicle;

generating and encrypting a report, said report comprising said sensor data and said detector data and said state data and said surrounding vehicle data residing in said memory, said generating and said encrypting being performed by an encryption and transmission manager that receives a request from a report manager, said encryption and transmission manager and said report manager both being attached to said vehicle; and after said generating and said encrypting said report, storing said report in said memory, said storing said report being performed by said encryption and transmission manager that receives a request from said report manager.

23. The method of claim 1, said method further comprising:

after said storing said report in said memory, storing a receipt in said memory, said storing said receipt being performed by said encryption and transmission manager that receives said receipt from said third party, said receipt comprising an acknowledgement that said third party received said report from said encryption and transmission manager in response to said vehicle being involved in said accident.

24. The process for supporting computer infrastructure of claim 22, wherein said sensor data is being requested by said information manager both cyclically and independently of said vehicle being involved in said accident.

25. The process for supporting computer infrastructure of claim 22, wherein each surrounding vehicle in said at least one surrounding vehicle is selected from the group consisting of a participant vehicle and a witness vehicle, said participant vehicle being involved in said accident with said vehicle, said witness vehicles not being involved in said accident but within such a proximity to said accident so as to being able to provide eyewitness information corresponding to a cause of said accident.

* * * * *